United States Patent [19]

Oyagi et al.

[11] Patent Number: 4,829,544
[45] Date of Patent: May 9, 1989

[54] BIT SYNCHRONIZATION CIRCUIT

[75] Inventors: Takashi Oyagi; Shigeo Yoshizawa, both of Tokyo, Japan

[73] Assignee: NEC Corporation, Japan

[21] Appl. No.: 32,853

[22] Filed: Mar. 31, 1987

[30] Foreign Application Priority Data

Mar. 31, 1986 [JP] Japan .................................. 61-74022

[51] Int. Cl.$^4$ .............................................. H04L 7/02
[52] U.S. Cl. ........................................ 375/119; 328/73
[58] Field of Search ...................... 328/63, 72, 74, 75, 328/155; 331/76, 14; 360/51; 375/106, 118, 119, 120; 370/100

[56] References Cited

U.S. PATENT DOCUMENTS

| 3,544,717 | 12/1970 | Smith | 375/118 |
|---|---|---|---|
| 4,105,979 | 8/1978 | Kage | 328/74 |
| 4,206,414 | 6/1980 | Chapman | 328/72 |
| 4,216,544 | 8/1980 | Boleda et al. | 375/119 |
| 4,229,824 | 10/1980 | En | 375/119 |
| 4,352,195 | 9/1982 | Dautremay et al. | 328/72 |

Primary Examiner—Benedict V. Safourek
Attorney, Agent, or Firm—Ostrolenk, Faber, Gerb & Soffen

[57] ABSTRACT

A synchronizing circuit for synchronizing the phase of a clock signal to the phase of a received digital signal includes a phase monitoring circuit for detecting, during each bit period of the digital signal, the phase advance of delay of the clock signal relative to the digital signals. A phase signal is outputting which is indicative of the phase advance or delay of the clock signal. A phase control circuit responds to the phase signal to either advance, delay or leave unchanged the phase of the clock signal with respect to the received digital signal. An inhibiting circuit coupled to the phase control circuit operates to prevent the phase control circuit from reversing the sense of the phase adjustment from advance to delay or from delay to advance in consecutive bit positions, interposing instead one bit position during which the phase of the clock signal is left unadjusted.

7 Claims, 5 Drawing Sheets

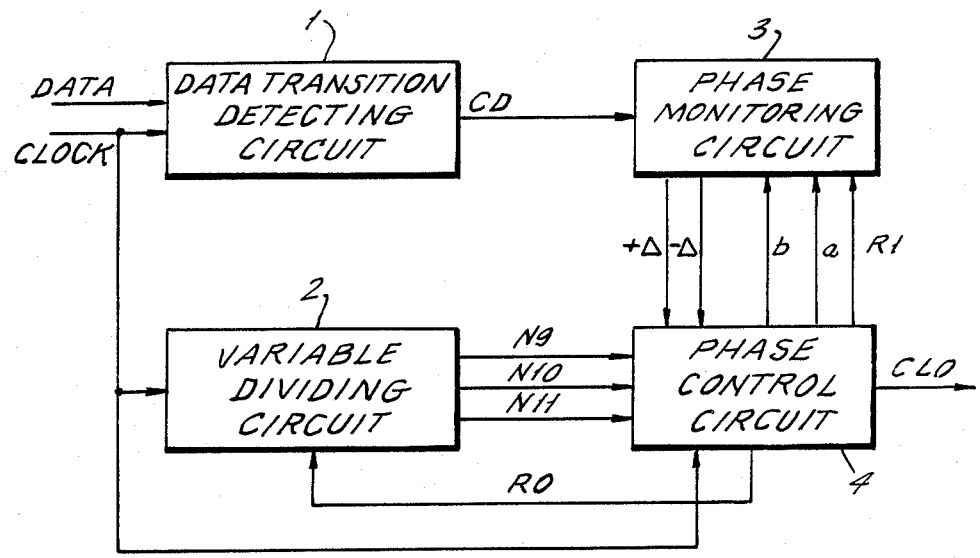
FIG. 1.
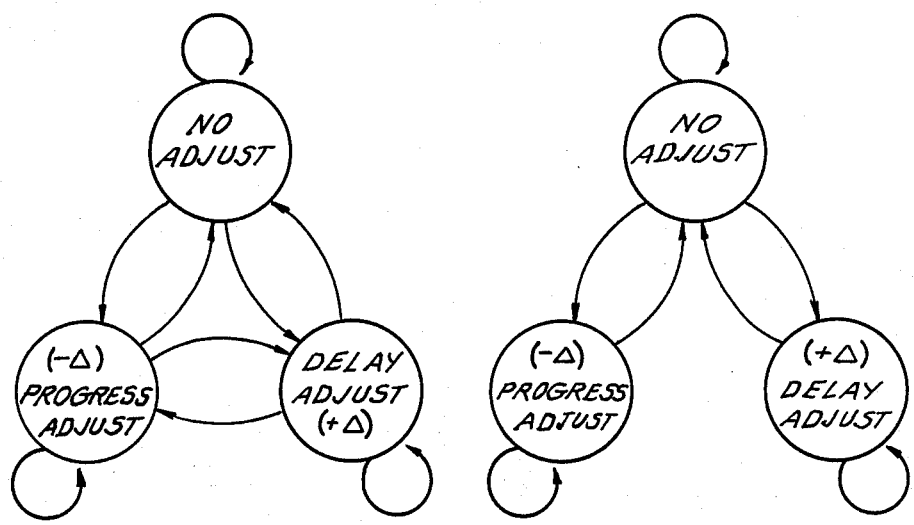
FIG. 4A.
PRIOR ART
FIG. 4B.

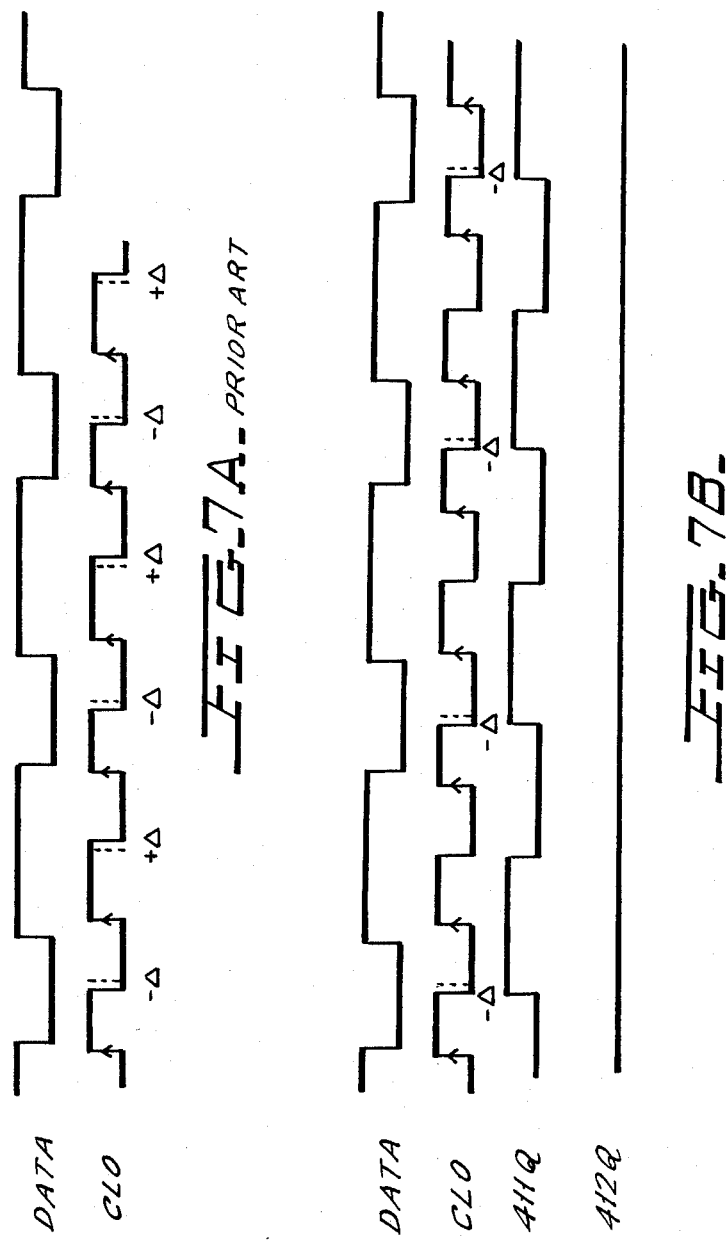

BIT SYNCHRONIZATION CIRCUIT

BACKGROUND OF THE INVENTION

The present invention relates to a bit synchronization circuit for regenerating clock signals which are synchronized to a received digital signal and, more particularly, to a bit synchronization circuit for regenerating such a clock signal by variable frequency division of an original clock signal and synchronizing the clock signal to the received digital signal.

A bit synchronization circuit of this type, in the prior art, generates a synchronized clock by extracting the transition point of the received digital signal. The frequency division ratio of a variable frequency divider is increased or decreased so as to synchronize the transition point of the digital signal and the trailing edge (or leading edge) of the regenerated synchronized clock with one another. The control of the variable frequency divider is effected for each bit of the received digital signal.

In the bit synchronization circuit of the prior art, because it operates for each bit of the received digital signal, the lead time and delay of the regenerated clock signal are alternately detected on a bit-by-bit basis if the duty cycle ratio of the received digital signal deviates from a balanced value of 50 percent. Therefore, the phase of the regenerated clock signal is not properly adjusted while the frequency division ratio of the frequency divider is changed on the basis of the detected information.

SUMMARY OF THE INVENTION

An object of the present invention, therefore, is to provide a bit synchronization circuit capable of phase adjustment even when the duty cycle ratio of the received signal is unbalanced.

According to the invention, there is provided a bit synchronization circuit for regenerating a synchronized clock signal which is synchronized with a received digital signal, comprising: a phase monitoring circuit for detecting bit by bit the phase lead or delay of the synchronized clock signal with respect to the digital signal to supply a phase difference signal; and a phase control circuit responsive to the phase difference signal for adjusting, or a bit by bit basis the phase of the synchronized clock signal so as to synchronize it with the digital signal. The phase adjustment of the phase control circuit is designed to prevent consecutive transitions of the phase adjustments between lead and delay adjustments.

BRIEF DESCRIPTION OF THE DRAWINGS

The above and other objects, features and advantages of the present invention will become more apparent from the description hereunder taken in conjunction with the accompanying drawings, wherein:

FIG. 1 shows a schematic block diagram of a preferred embodiment of a bit synchronization circuit according to the present invention.

FIG. 4A and 4B are state transition diagrams of bit synchronization circuits of the prior art and the present invention, respectively;

FIGS. 7A and 7B are timing diagrams showing the phase adjusting operations of the bit synchronization circuit of the prior art and the present invention, respectively.

DETAILED DESCRIPTION OF THE PREFERRED EMBODIMENT

Referring to FIG. 1, a data transition detecting circuit 1 generates a positive pulse at every leading or trailing transitional point of a received digital signal DATA. The received digital signal DATA and a clock signal are supplied as input signals to the detecting circuit 1. Detecting circuit 1, as is well known, may be composed of an exclusive OR circuit (ExOR) for receiving the digital signal DATA and another signal obtained by delaying the digital signal by a predetermined length of time and a D-type flip-flop for latching the output of this ExOR signal and outputting it as a detection signal CD. In this instance, the ExOR and the delay circuit function as a differentiating circuit.

A variable frequency dividing circuit 2 receives as an input a clock signal and outputs a signal which is obtained from a frequency division of the input clock signal. In a particular embodiment applicable herein the dividing circuit 2 provides a divided-by-10 signal as a frequency standard, along with a divided-by-9 signal and a divided-by-11 signal which are used for phase adjustment. Frequency-divided signals N9 to N11 are signals which are at a high level in the active state (active-high signals). Variable frequency dividing circuit 2 may be composed of the well known cascade connection of flip-flops, and frequency-divided signals N9 to N11 are taken out of their intermediate stages. Frequency dividing circuit 2 is reset by a reset pulse R0 supplied at half-bit intervals, as described later herein.

A phase monitoring circuit 3, as described in greater detail below, receives the output signal CD of data transition detecting circuit 1, signals a and b, to be described later, from a phase control circuit 4, and a reset pulse R1 indicating the bit cycle. The circuit 3 determines, on the basis of the received signals, whether the synchronized clock signal leads or is delayed with respect to the transition signal CD, and provides a phase signal $-\Delta$ representative of the lead condition or a signal $+\Delta$ representative of the delay condition at every bit cycle.

A phase control circuit 4, responds to the phase signals $-\Delta$ and $+\Delta$ of phase monitoring circuit 3 to select, at every bit location one of frequency division output signals N9 to N11 of frequency dividing circuit 2 to thereby adjust the phase of the synchronized clock to be synchronized with the received digital signal DATA. The selection of signals N9 to N11 also depends on the adjustments carried out for the immediately preceding bit.

Figure 2:
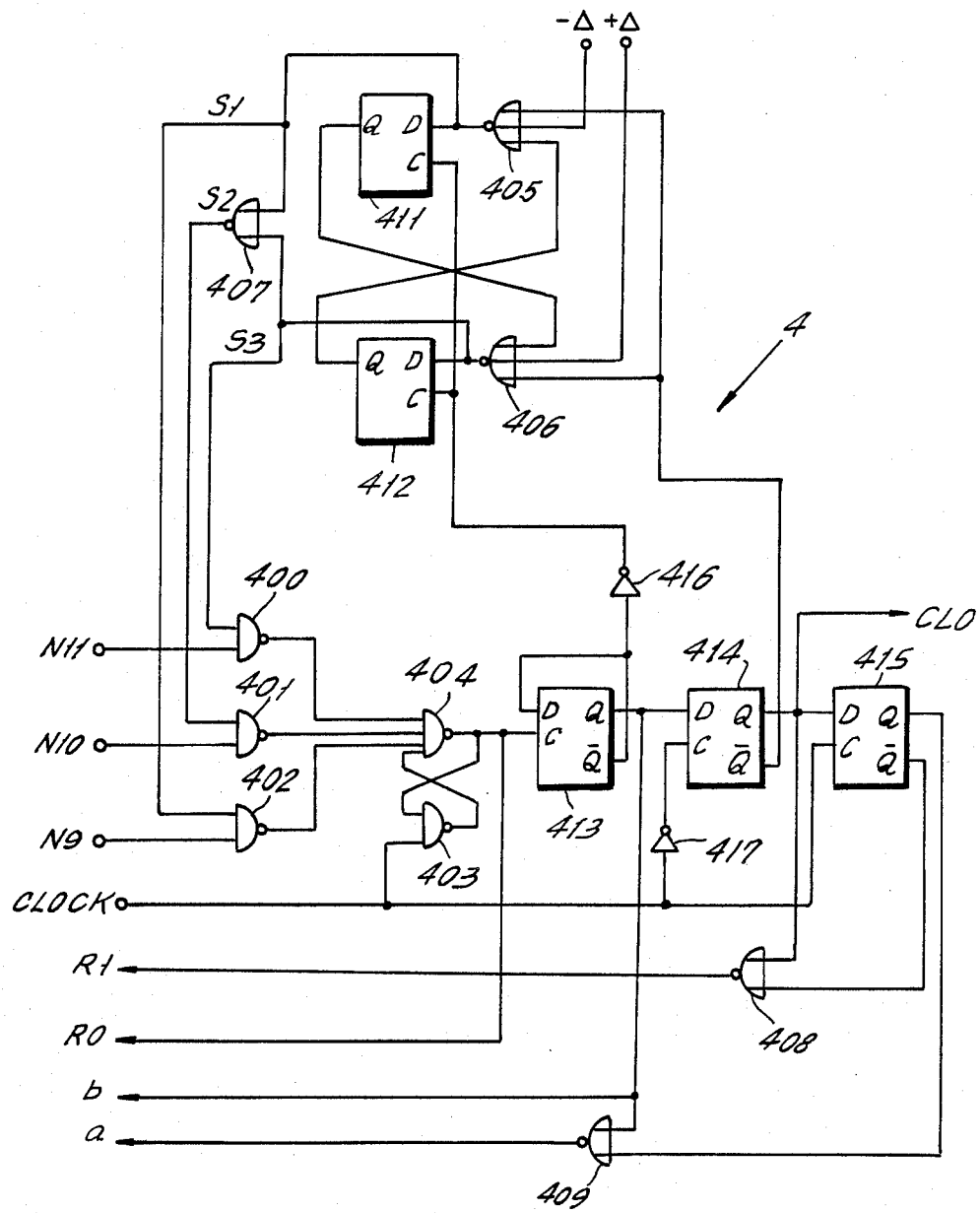
FIG. 2 is a schematic diagram showing a phase control circuit for the bit synchronization circuit of FIG. 1.

FIG. 2 illustrates an embodiment of the phase control circuit 4 of FIG. 1. The circuit comprises two-input NAND gates 400 to 403, three-input NAND gate 404, three-input NOR gates 405 and 406, two-input NOR gates 407 to 409, D-type flip-flops (F/Fs) 411 to 416, and inverters 416 and 417.

NAND gates 400 to 402 select one of frequency division output signals N9 to N11 of variable frequency dividing circuit 2. The selected signal is supplied to a set-reset (S-R) F/F comprised of gates 403 and 404. NAND gate 404 supplies as its output a positive pulse at every half bit. This output signal is inputted to the clock terminal of D-type F/F 413, and a divided-by-two signal obtained from the Q output terminal thereof is outputted as a synchronized clock signal CLO through D-type F/F 414. In response to the signal CLO, D-type F/F 415 provides at the Q and $\overline{Q}$ terminals thereof a signal delayed by a half clock bit from the signal CLO, and a complemented signal, respectively. The signal CLO and its complemented signal are inputted to NOR gate 408 which generates a reset signal R1 therefrom. The R1 signal is supplied; to the phase monitoring circuit 3.

NOR gates 405 to 407 generate, based on the phase signals $-\Delta$ and $+\Delta$ provided from phase monitoring circuit 3, gate signals S1 to S3 for selecting one of frequency-divided signals N9 to N11. The signals S1 to S3 are active-high signals. Phase signals $-\Delta$ and $+\Delta$ are active-low signals; that is they are at a low level in their active states. When the $\overline{Q}$ output of D-type F/F 414 is at a low level, the gates 405 and 406 are activated. In this state, when the Q outputs of D-type F/Fs 411 and 412 are at a low level, one of signals S1 to S3 is in the active state in accordance with the phase signals $-\Delta$ and $+\Delta$. Thus, the signals S1 to S3 are supplied in accordance with the following logic Table 1, though the Q outputs of D-type F/Fs 411 and 412 in this case are are logic "0".

TABLE 1

| $-\Delta$ | $+\Delta$ | S1 | S2 | S3 |
|---|---|---|---|---|
| 0 | 1 | 1 | 0 | 0 |
| 1 | 0 | 0 | 0 | 1 |
| 0 | 0 | 0 | 1 | 0 |
| 1 | 1 | 0 | 1 | 0 |

The signals S1 and S3 are latched into D-type F/Fs 411 and 412 by means of; the output of inverter 416 serving as a clock input. The Q outputs of flip flops 411 and 412 are supplied to NOR gates 405 and 406, respectively; which are complements of each other. As a result, at the bit next to the selection of signal S1, NOR gate 406 is disabled, and signal S3 is disabled.

Thus, as shown in FIG. 4B, in the bit synchronization circuit according to the present invention, the path between the lead and delay adjustments is prohibited, so that the phase of the regenerated clock signal can be adjusted even when the duty ratio of the received digital signal is unfavorable. By contrast, in the prior art arrangement of FIG. 4A, because it is possible to alternate between lead and delay adjustments, no phase adjustment is in fact possible, when the duty ratio of the received digital signal deviates from the 50% duty cycle value.

D-type F/Fs 411 and 412 latch or store the adjusting operation at the immediately preceding bit, and do not permit adjustments in the opposite sense at the next bit. Thus, if the adjustment at the preceding bit is for lead time, no delay adjustment is made at the next bit or, conversely, if a delay condition is adjusted at the preceding bit, no lead adjustment is made at the next bit. This operation is achieved by feeding back the Q terminal outputs of D type F/Fs 411 and 412 to NOR gates 406 and 405, respectively.

Figure 3:
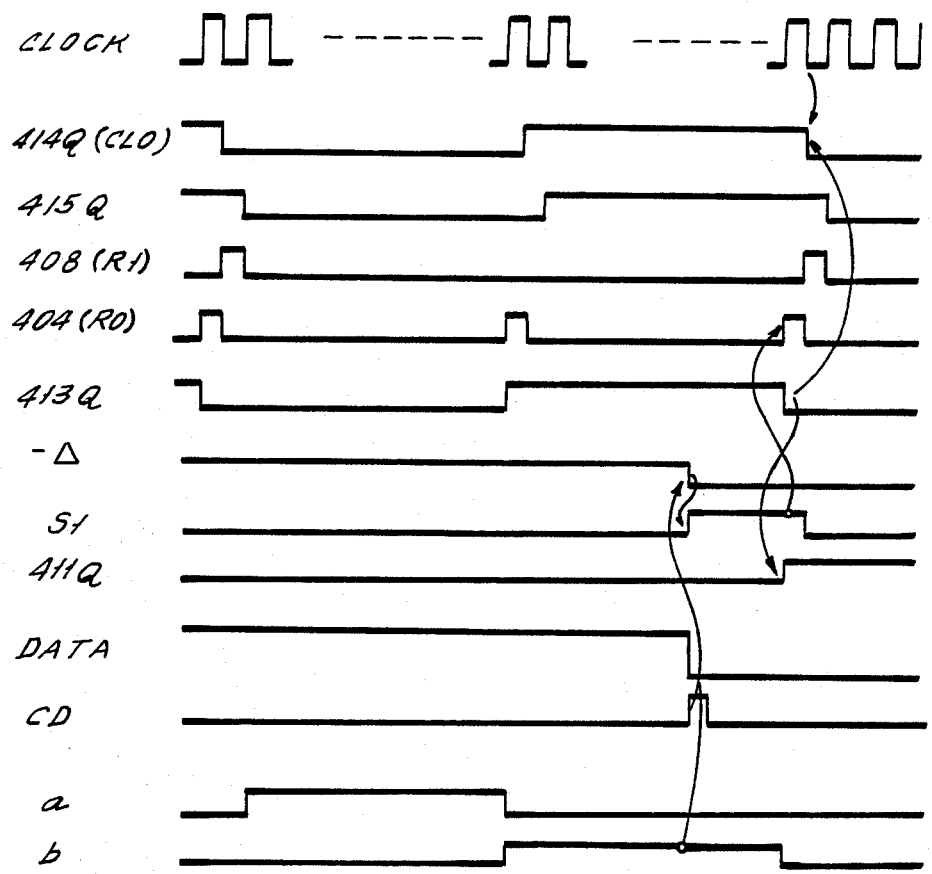
FIG. 3 shows a timing diagram for explaining the operation of the circuit shown in FIG. 2.

The operation of the circuit of FIG. 2 will be further described with reference to the timing diagram of FIG. 3, which shows a case in which the regenerated clock signal CLO is ahead of—that is it leads—the received digital signal DATA. At a transition; point of received digital signal DATA, the detection signal CD is outputted from the data transition detecting circuit 1 (see DATA and CD lines in FIG. 3). The phase monitoring circuit 3, receiving this signal CD and signals a and b obtained from the phase control circuit 4, supplies the phase signal $-\Delta$ to adjust lead time (see a, b and $-\Delta$ lines). Receiving this phase signal $-\Delta$, the phase control circuit 4 sets the selection signal S1 to a high level (see S1 line). In response to this selection signal S1, NAND gate 402 selects frequency division output signal N9, and so adjusts the synchronized clock signal CLO as to delay its phase by one original clock with S-R F/Fs 403 and 404 and D-type F/Fs 413 and 414 (see 404(R0), 413Q, 411Q, 414Q(CLO) and CLOCK lines).

FIGS. 7A and 7B are timing diagrams for showing comparatively synchronized clock signals obtained by a bit synchronization circuit of the prior art and by the present invention. When the duty cycle ratio of received digital signal DATA is unfavorable, in the prior art, the adjusting operation for the lead and delay conditions with respect to the signal DATA is alternately repeated at each bit, as shown in FIG. 7A. This results in that the phase difference between the synchronized clock signal CLO and the signal DATA remains unadjusted. By contrast, in the bit synchronization circuit according to the present invention, where no state transition takes place between the phase adjustments for lead or delay as stated above, the phase difference of synchronized clock signal CLO with respect to signal DATA is gradually adjusted as shown in FIG. 7B.

Figure 5:
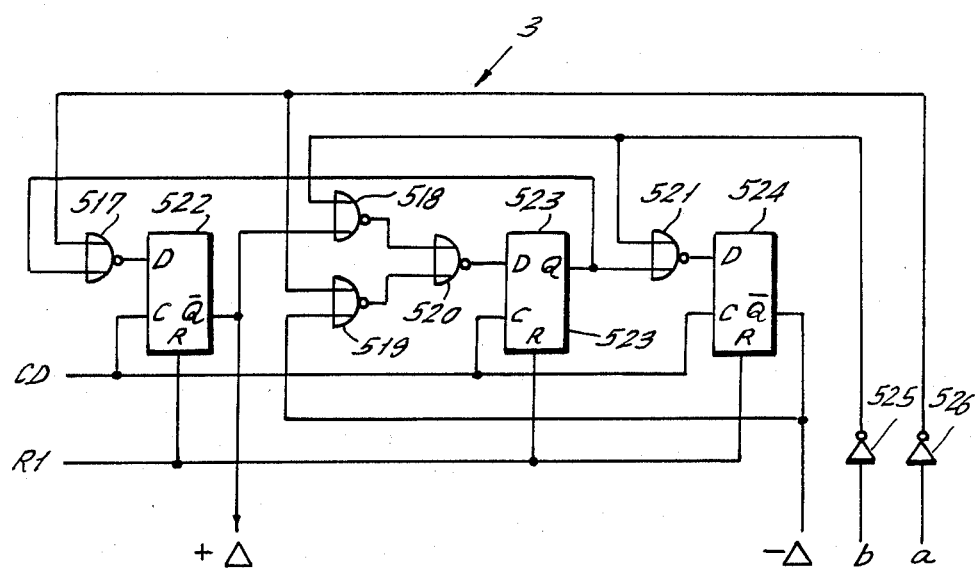
FIG. 5 is a schematic diagram showing a phase monitoring circuit for the bit synchronization circuit of FIG. 1.

FIG. 5 illustrates a specific example of the phase monitoring circuit 3 in FIG. 1. This circuit comprises two-input NOR gates 517 to 521, D-type F/Fs 522 to 524 and inverters 525 and 526. The operation of the phase monitoring circuit 3 will now be described with reference to the timing diagram of FIG. 6.

Figure 6:
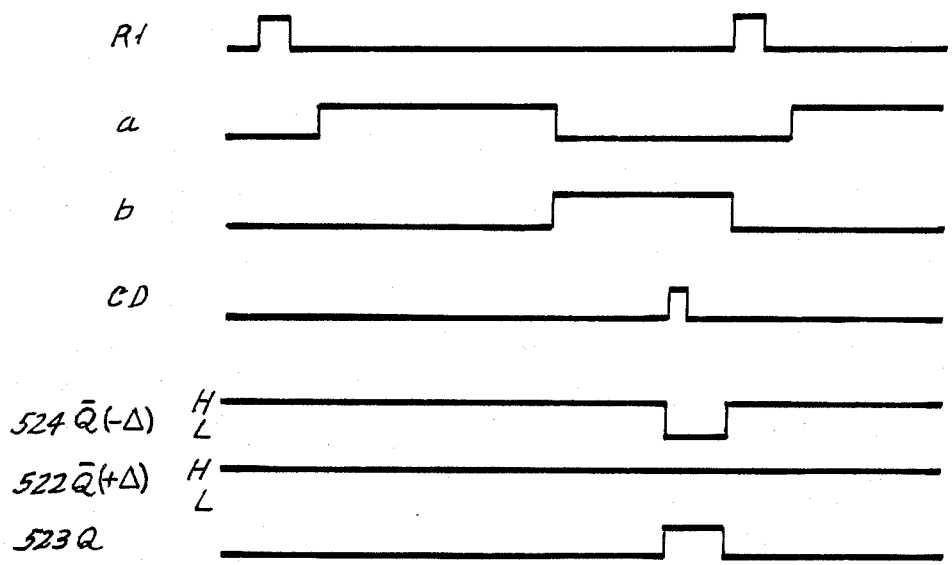
FIG. 6 is a timing diagram for explaining the operation of the circuit shown in FIG. 5.

In response to a reset signal R1 from phase control circuit 4, which is provided once per bit, D-type F/Fs 522 to 524 are initialized. The phase monitoring is accomplished with output signals a and b of phase control circuit 4 and the output signal CD of data transition detecting circuit 1. Thus, if the signal CD is outputted when signal b in FIG. 6 is at a high level, a high level signal is latched through NOR gate 521 at D-type F/F 524. The $\overline{Q}$ output terminal of D-type F/F 524 then supplies; an active-low phase signal $-\Delta$. Similarly, if the signal CD is outputted when signal a is at a high level, D-type F/F 522 latches a high level signal from NOR gate 517, and its $\overline{Q}$ terminal supplies an active-low phase signal $+\Delta$.

Described in more detail, the signals a and b from phase control circuit 4 are signals representing the first and second halves, respectively, of one bit period of synchronized clock signal CLO. The phase monitoring circuit 3 decides whether the transition point signal CD of digital signal DATA is present at the active-high condition of signal a or signal b, or at neither. Thus if the signal CD is present when signal a is active, the synchronized clock signal CLO is determined to be behind the digital signal DATA, and the signal $+\Delta$ for delay adjustment is outputted. Conversely, if the signal CD is present when signal b is active, it is judged to be ahead, and the signal $-\Delta$ for advance adjustment is outputted.

D-type F/F 523 prevents execution of the phase adjustment when two or more signals CD are present in one data bit. Thus, upon the second generation of signal CD in one data bit, the $\overline{Q}$ terminal outputs of D-type F/Fs 522 and 524 rise to a high level. D-type F/F 523 improves the ability of the circuit to operate in a noise environment where spurious CD signals may appear.

As described above, the bit synchronization circuit according to the present invention disables the phase adjustment of synchronized clock signals to alternate advance and delay adjustments. Therefore, even when the duty cycle ratio of the received digital signals is unfavorable, the phase difference between the received digital signal and the regenerated clock signal is gradually adjusted. Received digital signals can be properly sampled accordingly to thereby obtain synchronized clocks, resulting in improvement of reception performance and reliability of digital signals.

What is claimed is:

1. A synchronization circuit for synchronizing a clock signal to a received digital signal, comprising:
    a phase monitoring circuit for detecting, during each bit period associated with said digital signal, the advance or delay of the phase of said clock signal with respect to said digital signal and for producing a phase signal indicative of said advance or delay;
    a phase control circuit, responsive to said phase signal, for selectively adjusting, during each said bit period, the phase of said clock signal by either advancing, delaying, or leaving unchanged the phase of said clock signal with respect to said digital signal; and
    inhibiting means, coupled to said phase control circuit, for inhibiting said phase control circuit from advancing the phase of said clock signal if said phase was delayed during an immediately preceding bit period or from delaying said phase if said phase was advanced during an immediately preceding bit period whereby said phase control circuit causes the phase of said clock signal to remain unchanged for at least one bit period before a change in the sense of said phase adjustment is effected.

2. A synchronization circuit as in claim 1, further comprising:
    edge detecting means for detecting one edge of two signal edges associated with each bit of said digital signal, said two signal edges including a leading edge and a trailing edge, and for outputting an edge indicating signal in response to the detection of said one edge;
    a frequency dividing circuit for outputting first, second and third frequency-divided clock signals, said frequency-divided clock signals being obtained from an original clock the frequency of which has been respectively divided by first, second and third distinct division values;
    said phase control circuit including supplying means for supplying first and second control signals, the first and second control signals being respectively representative of a first and a second half-bit period of said clock signal;
    said phase monitoring circuit including decision means for determining the location of said edge indicating signal relative to said first and second control signals and for outputting said phase signal in a form which is indicative whether the phase of said clock signal is to be advanced, delayed or left unchanged; and
    said phase control circuit further including latching means for latching said phase signal from said decision means during each bit period and for selecting one of said first, second or third frequency-divided clock signals for, respectively, advancing, leaving unchanged, or delaying said phase of said clock signal, in response to the state of said phase signal during the present and during the immediately preceding bit period of said received digital signal.

3. A synchronization circuit for synchronizing a clock signal to a received digital signal, comprising:
    edge detecting means for detecting one edge of two signal edges of said digital signal, said two signal edges including a leading edge and a trailing edge, and for outputting an edge indicating signal in response to the detection of said one edge;
    phase monitoring means, responsive to said edge indicating signal and to said clock signal, for producing a phase signal which is indicative of the advance or delay of the phase of said clock signal with respect to said digital signal; and
    phase control means, responsive to said phase signal, for selectively adjusting, during each bit period associated with said digital signal, the phase of said clock signal to synchronize it with said digital signal, said phase control means including means for inhibiting direct transition, during adjacent bit periods, from advancing to delaying or from delaying to advancing the phase of said clock signal.

4. A method for synchronizing a clock signal to a received digital signal, comprising the steps of:
    detecting a phase relationship of said clock signal with respect to said digital signal, during each bit period associated with said digital signal, and providing a phase signal which is indicative of whether said clock signal is advanced, delayed or substantially in synchronism with respect to said digital signal;
    adjusting the phase of said clock signal, in response to said phase signal, in a manner which tends to synchronize said clock signal to said digital signal; and
    controlling the phase adjustment so that the sense of the phase adjustment is not reversed in adjacent bit periods associated with said digital signal.

5. A method as in claim 4, further comprising the steps of:
    detecting the occurrence of a signal edge of said digital signal during each bit period;
    determining the state of said phase relationship during the occurrence of said signal edge and producing said phase signal based on said relationship;
    dividing the frequency of an original clock by a plurality of different division values to supply a plurality of distinct frequency-divided clock signals of different frequencies;
    latching said phase signal during each bit period of said digital signal;
    selecting one of said frequency-divided clock signals on the basis of the state of said phase signal during a present bit period and during an immediately preceding bit period; and
    adjusting the phase of said clock signal by synchronizing the phase thereof to the phase of the selected frequency-divided clock signal.

6. A synchronization circuit for synchronizing a clock signal to a digital signal, comprising:

a frequency-dividing circuit for supplying a plurality of distinct frequency-divided clock signals which are derived from an original clock signal by frequency division of the original clock;

a phase monitoring circuit, responsive to said clock signal and digital signal, for monitoring the phase of said clock signal with respect to said digital signal, during each bit period associated with said digital signal, and for supplying a phase signal representative of the phase advance or phase delay of said clock signal relative to said digital signal;

a phase control circuit, coupled to said phase monitoring circuit and to said frequency-dividing circuit, for selecting one of said plurality of frequency-divided clock signals, on the basis of said phase signal, and for employing said selected one of said plurality of frequency-divided clock signals for synchronizing said clock signal; and said phase control circuit further including memory means for temporarily storing therein a signal which is indicative of a previously selected one of said frequency-divided signals, said phase control circuit being effective to select one of said plurality of frequency-divided clock signals on the basis of the signal stored in said memory means and on the basis of the current state of said phase signal in a manner such that the sense of the phase adjustment for said clock signal is not reversed in consecutive bit periods.

7. A synchronization circuit for synchronizing a clock signal to a received digital signal, comprising:

detecting means for detecting a phase relationship, during each bit period associated with said digital signal, between said clock signal and said digital signal and for outputting a present phase signal which indicates whether the present phase of said clock signal is advanced, delayed or substantially synchronized relative to said digital signal;

memory means, coupled to the detecting means, for storing a previous-bit-period phase signal which is indicative of the state of said phase signal during an immediately preceding bit period of said digital signal; and a phase control circuit, responsive to said present phase signal and said previous-bit-period phase signal stored in said memory means, for controlling the phase of said clock signal such that the phase of said clock signal is adjusted to said digital signal on the basis of said present phase signal and said previous-bit-period phase signal in a manner such that the sense of the adjustment is not reversed in consecutive bit periods.

* * * * *